(12) United States Patent
Sherazi et al.

(10) Patent No.: US 11,695,666 B2
(45) Date of Patent: Jul. 4, 2023

(54) SYSTEM AND METHOD FOR AGENTLESS INFRASTRUCTURE AGNOSTIC APPLICATION DRIFT DETECTION AND MANAGEMENT

(71) Applicant: JPMorgan Chase Bank, N.A., New York, NY (US)

(72) Inventors: Mustafa Sherazi, Katy, TX (US); Farhan Ahmed, Houston, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/362,533

(22) Filed: Jun. 29, 2021

(65) Prior Publication Data

US 2021/0409297 A1  Dec. 30, 2021

Related U.S. Application Data

(60) Provisional application No. 63/046,179, filed on Jun. 30, 2020.

(51) Int. Cl.
*H04L 43/065* (2022.01)
*H04L 43/0817* (2022.01)
*G06N 20/00* (2019.01)
*H04L 41/08* (2022.01)
*H04L 41/0816* (2022.01)

(52) U.S. Cl.
CPC .......... *H04L 43/065* (2013.01); *G06N 20/00* (2019.01); *H04L 41/0816* (2013.01); *H04L 41/0886* (2013.01); *H04L 43/0817* (2013.01)

(58) Field of Classification Search
CPC .............. H04L 43/065; H04L 41/0816; H04L 41/0886; H04L 43/0817; G06N 20/00
See application file for complete search history.

(56) References Cited

U.S. PATENT DOCUMENTS

| | | | | |
|---|---|---|---|---|
| 10,743,809 | B1* | 8/2020 | Kamousi | G06N 20/00 |
| 10,924,334 | B1* | 2/2021 | Kumar | H04L 67/55 |
| 2011/0078106 | A1* | 3/2011 | Luchi | G06F 11/3452 706/48 |
| 2013/0117852 | A1* | 5/2013 | Stute | H04L 63/1425 726/23 |
| 2015/0070188 | A1* | 3/2015 | Aramburu | A01G 25/167 340/870.02 |
| 2018/0039898 | A1* | 2/2018 | Saini | G06F 11/3447 |
| 2019/0294519 | A1* | 9/2019 | Garg | G06F 11/3034 |
| 2020/0252416 | A1* | 8/2020 | Niv | H04L 63/1416 |
| 2021/0064708 | A1* | 3/2021 | Dellinger | G06F 17/40 |
| 2021/0112488 | A1* | 4/2021 | Meredith | H04W 12/06 |
| 2021/0116904 | A1* | 4/2021 | Schuster | G05B 15/02 |

* cited by examiner

*Primary Examiner* — Philip C Lee
(74) *Attorney, Agent, or Firm* — Greenblum & Bernstein, P.L.C.

(57) ABSTRACT

A system and a method for monitoring and detecting drifts and configuration changes in an infrastructure that facilitates the availability of software applications to a large organization are provided. The method includes: obtaining metric information that indicates values of various parameters that relate to the infrastructure; comparing the obtained metric information with expected values thereof; determining whether a drift has occurred based on a result of the comparison; and providing a notification of a detected drift. When a drift is detected, a potential remedy may be diagnosed and automatically applied.

11 Claims, 5 Drawing Sheets

SYSTEM AND METHOD FOR AGENTLESS INFRASTRUCTURE AGNOSTIC APPLICATION DRIFT DETECTION AND MANAGEMENT

CROSS-REFERENCE TO RELATED APPLICATIONS

This application claims the benefit of U.S. Provisional Patent Application Ser. No. 63/046,179, filed Jun. 30, 2020, which is hereby incorporated by reference in its entirety.

BACKGROUND

1. Field of the Disclosure

This technology generally relates to methods and systems for performing configuration management, and more particularly to methods and systems for monitoring and detecting drifts and configuration changes in an infrastructure that facilitates the availability of software applications to a large organization.

2. Background Information

Globally distributed teams with growing infrastructure face a challenge of lacking a unified distributed build and configuration information. Conventionally, real time management of infrastructure and application components may be implemented by using a commercial off-the-shelf solution.

However, such a solution may be agent-based, and/or may not integrate well with an environment that has a critical infrastructure where accessing hosts is unreliable and unsecure. In this regard, reliance on agents creates a large amount of overhead with respect to monitoring and deploying agents, and also creates a possibility of unavailability, which may be costly.

Accordingly, there is a need for an agentless infrastructure agnostic drift detection and management solution that automatically retrieves information from infrastructure on demand or when underlying infrastructure changes, and that protects critical host login credentials, thereby avoiding a security loophole.

SUMMARY

The present disclosure, through one or more of its various aspects, embodiments, and/or specific features or sub-components, provides, inter alia, various systems, servers, devices, methods, media, programs, and platforms for monitoring and detecting drifts and configuration changes in an infrastructure that facilitates the availability of software applications to a large organization.

According to an aspect of the present disclosure, a method for managing a configuration of an infrastructure that supports a plurality of applications is provided. The method is implemented by at least one processor. The method includes: obtaining, by the at least one processor, metric information that indicates a value of at least one parameter from among a plurality of parameters that relates to the infrastructure; comparing, by the at least one processor, the obtained metric information with at least one expected value that relates to the obtained metric information; determining, by the at least one processor, whether a drift has occurred based on a result of the comparing; and transmitting, to a user by the at least one processor, a notification message that indicates a result of the determining.

The method may further include: determining, when a drift is determined as having occurred, a potential remedy for the drift; and applying the potential remedy to at least one application from among the plurality of applications.

The obtaining of the metric information may include using at least one microservice to obtain the metric information from at least one application from among the plurality of applications.

The plurality of parameters may include a first set of parameters that relates to application-specific information, a second set of parameters that relates to database-specific information, and a third set of parameters that relates to servers configured to host at least one application from among the plurality of applications.

The comparing may include using a machine learning algorithm to analyze the obtained metric information and the at least one expected value of the obtained metric information.

The method may further include determining, when a drift is determined as having occurred, a magnitude of the drift.

The comparing may include determining, for a first parameter from among the plurality of parameters, a percentage difference between the obtained metric information for the first parameter and the at least one expected value that relates to the obtained metric information for the first parameter. The determining of whether a drift has occurred may include determining whether the determined percentage difference exceeds a predetermined threshold value for the first parameter.

The predetermined threshold value for the first parameter may be at least 10% and at most 100%.

The notification message may include the obtained metric information for the first parameter and the at least one expected value that relates to the obtained metric information for the first parameter.

According to another exemplary embodiment, a computing apparatus for managing a configuration of an infrastructure that supports a plurality of applications is provided. The computing apparatus includes a processor; a memory; and a communication interface coupled to each of the processor and the memory. The processor is configured to: obtain metric information that indicates a value of at least one parameter from among a plurality of parameters that relates to the infrastructure; compare the obtained metric information with at least one expected value that relates to the obtained metric information; determine whether a drift has occurred based on a result of the comparison; and transmit, to a user via the communication interface, a notification message that indicates a result of the determination.

The processor may be further configured to: determine, when a drift is determined as having occurred, a potential remedy for the drift; and apply the potential remedy to at least one application from among the plurality of applications.

The processor may be further configured to obtain the metric information by using at least one microservice to obtain the metric information from at least one application from among the plurality of applications.

The plurality of parameters may include a first set of parameters that relates to application-specific information, a second set of parameters that relates to database-specific information, and a third set of parameters that relates to servers configured to host at least one application from among the plurality of applications.

The processor may be further configured to perform the comparison by using a machine learning algorithm to analyze the obtained metric information and the at least one expected value of the obtained metric information.

The processor may be further configured to determine, when a drift is determined as having occurred, a magnitude of the drift.

The processor may be further configured to: determine, for a first parameter from among the plurality of parameters, a percentage difference between the obtained metric information for the first parameter and the at least one expected value that relates to the obtained metric information for the first parameter; and determine whether the determined percentage difference exceeds a predetermined threshold value for the first parameter.

The predetermined threshold value for the first parameter may be at least 10% and at most 100%.

The notification message may include the obtained metric information for the first parameter and the at least one expected value that relates to the obtained metric information for the first parameter.

According to yet another exemplary embodiment, a non-transitory computer readable storage medium storing instructions for managing a configuration of an infrastructure that supports a plurality of applications is provided. The storage medium includes executable code which, when executed by a processor, causes the processor to: obtain metric information that indicates a value of at least one parameter from among a plurality of parameters that relates to the infrastructure; compare the obtained metric information with at least one expected value that relates to the obtained metric information; determine whether a drift has occurred based on a result of the comparison; and transmit, to a user, a notification message that indicates a result of the determination.

The executable code may be further configured to cause the processor to: determine, when a drift is determined as having occurred, a potential remedy for the drift; and apply the potential remedy to at least one application from among the plurality of applications.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
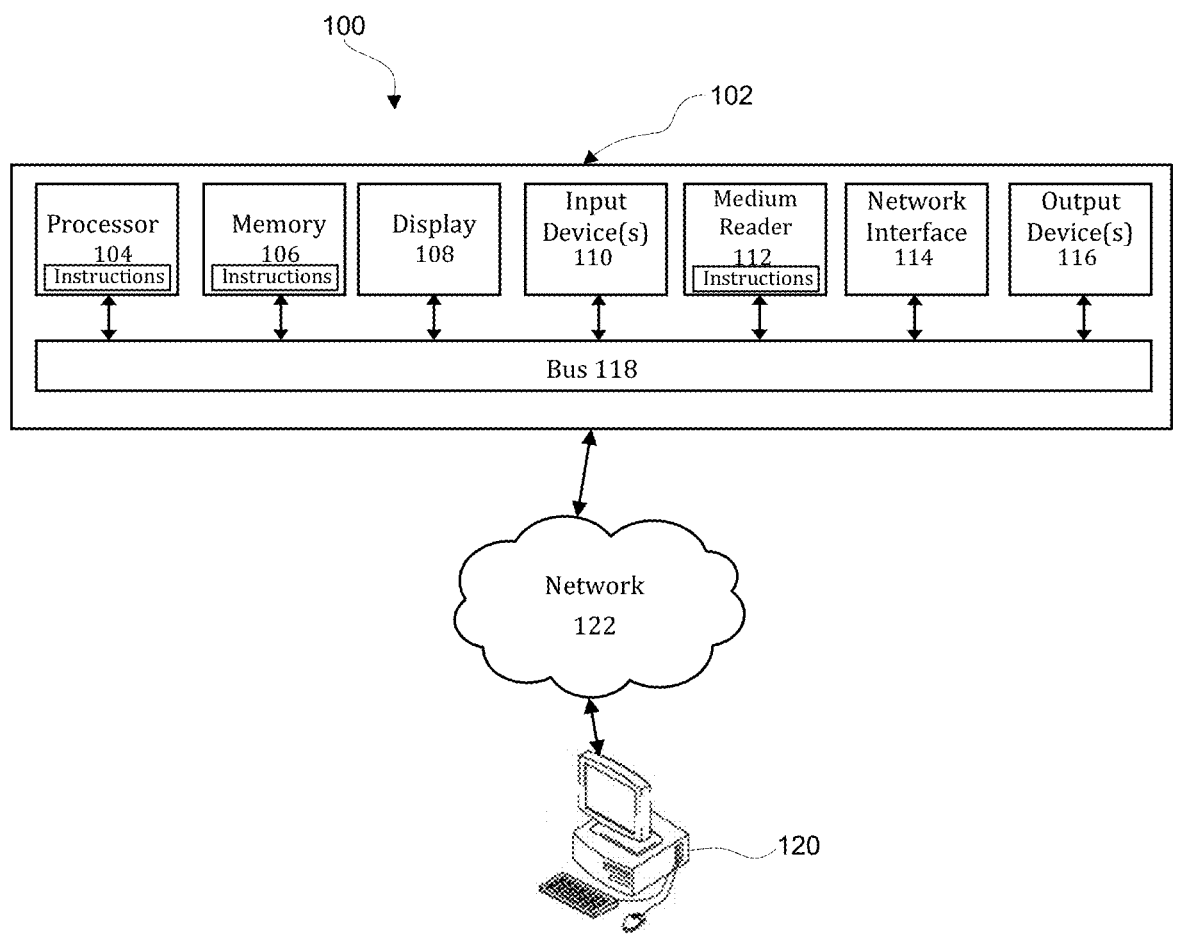
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, a device that is running the Apple iOS operating system, a device that is running the Android operating system, a device that is capable of running a web browser to connect to the Internet, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, a device that is running the Apple iOS operating system, a device that is running the Android operating system, a device that is capable of running a web browser to connect to the Internet, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for monitoring and detecting drifts and configuration changes in an infrastructure that facilitates the availability of software applications to a large organization.

Figure 2:
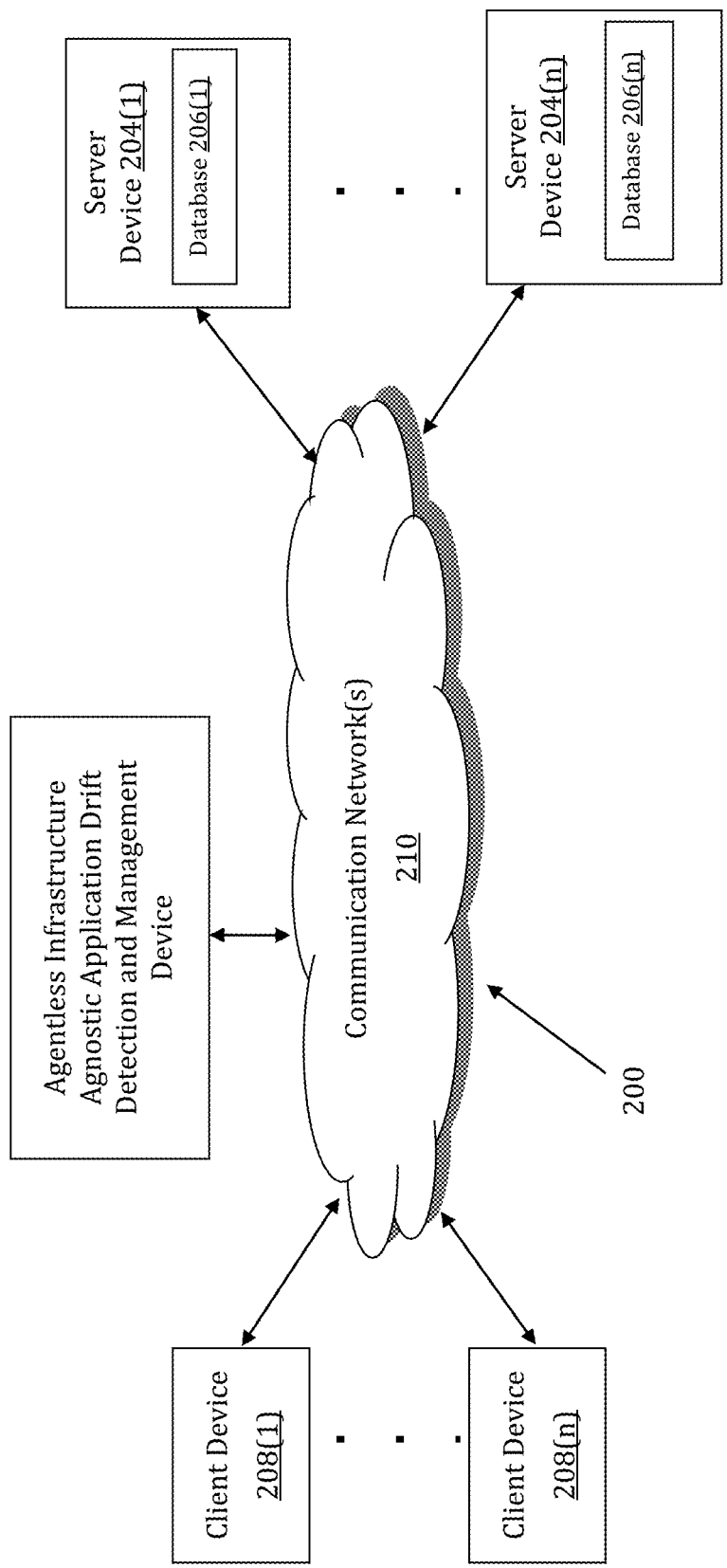
FIG. 2 illustrates an exemplary diagram of a network environment.

Referring to FIG. 2, a schematic of an exemplary network environment 200 for implementing a method for monitoring and detecting drifts and configuration changes in an infrastructure that facilitates the availability of software applications to a large organization is illustrated. In an exemplary embodiment, the method is executable on any networked computer platform, such as, for example, a personal computer (PC), a device that is running the Apple iOS operating system, a device that is running the Android operating system, or a device that is capable of running a web browser to connect to the Internet.

The method for monitoring and detecting drifts and configuration changes in an infrastructure that facilitates the availability of software applications to a large organization may be implemented by an Agentless Infrastructure Agnostic Application Drift Detection and Management (AIAADDM) device 202. The AIAADDM device 202 may be the same or similar to the computer system 102 as described with respect to FIG. 1. The AIAADDM device 202 may store one or more applications that can include executable instructions that, when executed by the AIAADDM device 202, cause the AIAADDM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the AIAADDM device 202 itself, may be located in virtual server(s) running in a cloud-based computing environment rather than being tied to one or more specific physical network computing devices. Also, the application(s) may be running in one or more virtual machines (VMs) executing on the AIAADDM device 202. Additionally, in one or more embodiments of this technology, virtual machine(s) running on the AIAADDM device 202 may be managed or supervised by a hypervisor.

In the network environment 200 of FIG. 2, the AIAADDM device 202 is coupled to a plurality of server devices 204(1)-204(n) that hosts a plurality of databases 206(1)-206(n), and also to a plurality of client devices 208(1)-208(n) via communication network(s) 210. A communication interface of the AIAADDM device 202, such as the network interface 114 of the computer system 102 of FIG. 1, operatively couples and communicates between the AIAADDM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the AIAADDM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and AIAADDM devices that efficiently implement methods and systems for monitoring and detecting drifts and configuration changes in an infrastructure that facilitates the availability of software applications to a large organization.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The AIAADDM device 202 may be a standalone device or integrated with one or more other devices or apparatuses, such as one or more of the server devices 204(1)-204(n), for example. In one particular example, the AIAADDM device 202 may include or be hosted by one of the server devices 204(1)-204(n), and other arrangements are also possible. Moreover, one or more of the devices of the AIAADDM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the AIAADDM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206

(n) that are configured to store data that relates to infrastructure configurations, drift detection metrics, and application-specific data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the AIAADDM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the AIAADDM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the AIAADDM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the AIAADDM device 202, the server devices 204(1)-204(n), or the client devices 208(1)-208(n), for example, may be configured to operate as virtual instances on the same physical machine. In other words, one or more of the AIAADDM device 202, the server devices 204(1)-204(n), or the client devices 208(1)-208(n) may operate on the same physical device rather than as separate devices communicating through communication network(s) 210. Additionally, there may be more or fewer AIAADDM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
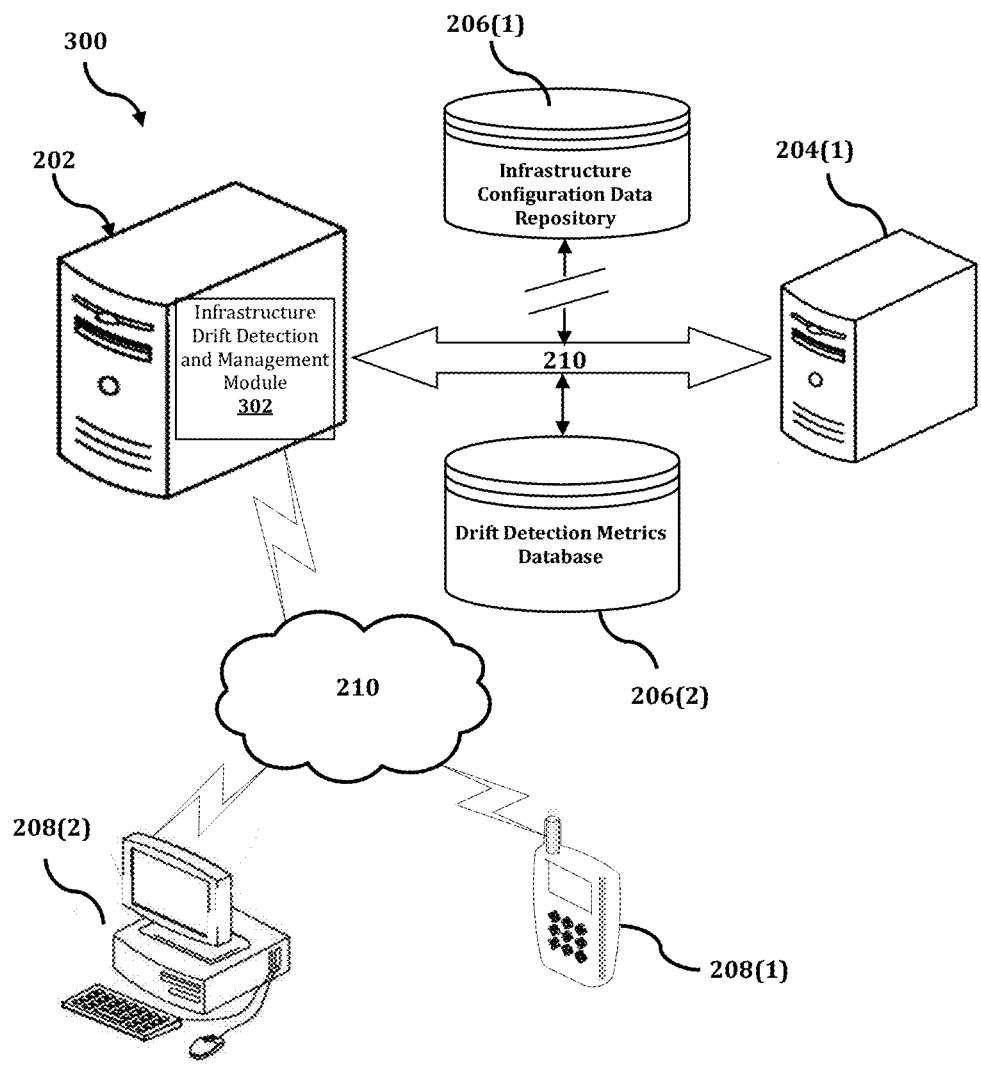
FIG. 3 shows an exemplary system for implementing a method for monitoring and detecting drifts and configuration changes in an infrastructure that facilitates the availability of software applications to a large organization.

The AIAADDM device 202 is described and illustrated in FIG. 3 as including an infrastructure drift detection and management module 302, although it may include other rules, policies, modules, databases, or applications, for example. As will be described below, the infrastructure drift detection and management module 302 is configured to implement a method for monitoring and detecting drifts and configuration changes in an infrastructure that facilitates the availability of software applications to a large organization.

An exemplary process 300 for implementing a mechanism for monitoring and detecting drifts and configuration changes in an infrastructure that facilitates the availability of software applications to a large organization by utilizing the network environment of FIG. 2 is illustrated as being executed in FIG. 3. Specifically, a first client device 208(1) and a second client device 208(2) are illustrated as being in communication with AIAADDM device 202. In this regard, the first client device 208(1) and the second client device 208(2) may be "clients" of the AIAADDM device 202 and are described herein as such. Nevertheless, it is to be known and understood that the first client device 208(1) and/or the second client device 208(2) need not necessarily be "clients" of the AIAADDM device 202, or any entity described in association therewith herein.

Any additional or alternative relationship may exist between either or both of the first client device 208(1) and the second client device 208(2) and the AIAADDM device 202, or no relationship may exist. For example, the AIAADDM device 202 and the first client device 208(1) may be configured as the same physical device.

Further, AIAADDM device 202 is illustrated as being able to access an infrastructure configuration data repository 206(1) and a drift detection metrics database 206(2). The infrastructure drift detection and management module 302 may be configured to access these databases for implementing a method for monitoring and detecting drifts and configuration changes in an infrastructure that facilitates the availability of software applications to a large organization.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the AIAADDM device 202 via broadband or cellular communication. Alternatively, the process may be executed by the AIAADDM device 202 in a standalone manner, e.g., by a smart phone on which the infrastructure drift detection and management module 302 has been downloaded. Of course, these embodiments are merely exemplary and are not limiting or exhaustive.

Upon being started, a processor that is hosted in the AIAADDM device 202 executes a process for monitoring and detecting drifts and configuration changes in an infrastructure that facilitates the availability of software applications to a large organization. An exemplary process for monitoring and detecting drifts and configuration changes in an infrastructure that facilitates the availability of software applications to a large organization is generally indicated at flowchart 400 in FIG. 4.

Figure 4:
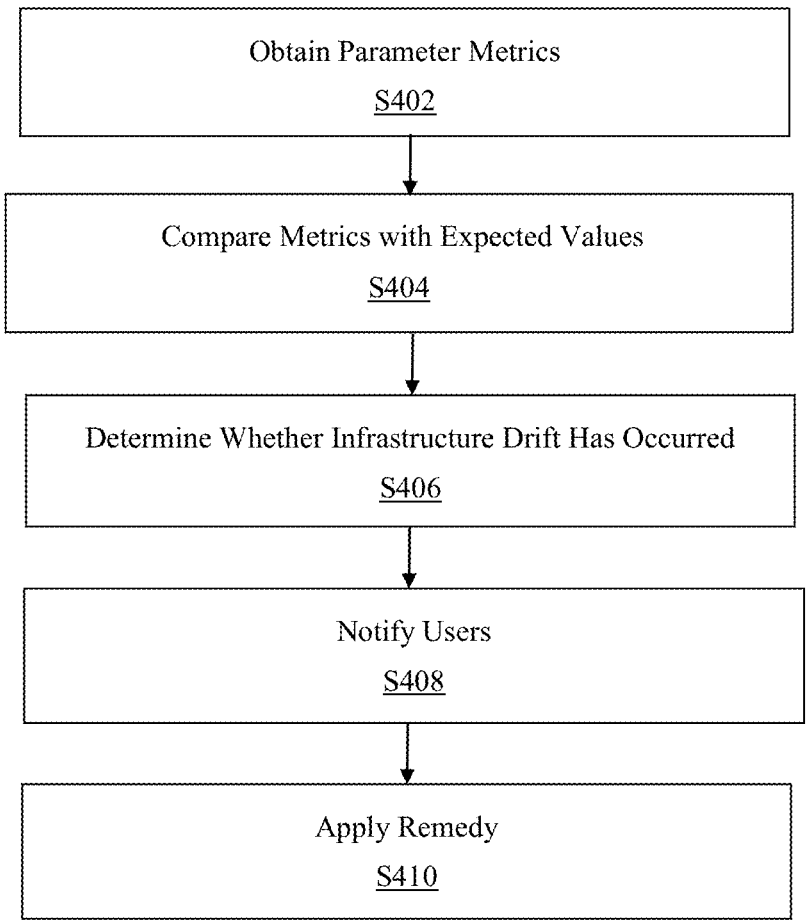
FIG. 4 is a flowchart of an exemplary process for implementing a method for monitoring and detecting drifts and configuration changes in an infrastructure that facilitates the availability of software applications to a large organization.

In process 400 of FIG. 4, at step S402, the infrastructure drift detection and management module 302 obtains metrics for various parameters that relate to the infrastructure. In an exemplary embodiment, the parameters may be categorized by parameter type, such as, for example, a first parameter type that relates to application-specific information, a second parameter type that relates to database-specific information, and a third parameter type that relates to servers that function as hosts for applications within the infrastructure. However, the present disclosure is not limited to these categories of parameters; other parameter types may also be used, including any parameter type that is suitable for providing information about the infrastructure.

In an exemplary embodiment, the obtaining of a metric for a particular parameter may be implemented by using a microservice. The infrastructure may be configured to enable many microservices to perform various respective functions that are usable for obtaining values that correspond to the parameters.

At step S404, the infrastructure drift detection and management module 302 compares the obtained metrics with expected values that correspond to the parameters. In an exemplary embodiment, an expected value for each parameter may be stored in a memory, such as, for example, drift detection metrics database 206(2), and for any particular parameter, the obtained metric value may be compared with the expected value thereof. The comparison may be performed by using a machine learning algorithm that has been trained by historical metric data.

At step S406, the infrastructure drift detection and management module 302 determines whether a drift has occurred in the infrastructure based on a result of the comparison performed in step S404. In an exemplary embodiment, the data may be analyzed to determine a type of drift, a magnitude of a drift, and potential remedies for the drift. The data analysis may also be performed by using a machine learning algorithm.

In an exemplary embodiment, with regard to analyzing the data to determine a magnitude of a drift, the comparison performed at step S404 may include determining, for a particular parameter, a percentage difference between the obtained metric information and the expected value for the particular parameter. Then, the determination performed at step S406 may include determining whether the determined percentage difference exceeds a predetermined threshold value for the particular parameter. In an exemplary embodiment, the predetermined threshold value for the particular parameter is at least 10% and at most 100%. However, the threshold values may be determined on an individualized, parameter-by-parameter basis, and so for some parameters, the corresponding threshold values may fall outside of the 10%-100% range.

At step S408, when a determination has been made in step S406 that a drift has occurred, the infrastructure drift detection and management module 302 transmits a notification message to a user in order to inform the user that a drift has been detected. In an exemplary embodiment, the notification message may also indicate additional descriptive information about the drift and potential remedies that could be applied to one or more applications. The notification message may also include the obtained metric information and the expected value information for a particular parameter that relates to the detected drift.

At step S410, the infrastructure drift detection and management module may apply a remedy to an application. In accordance with exemplary embodiments as disclosed herein, the systems and methods for monitoring and detecting drifts and configuration changes in an infrastructure that facilitates the availability of software applications to a large organization may be understood as having a self-healing quality by which a drift is diagnosed and analyzed and then a potential remedy is identified and automatically applied without requiring an intervention by a human agent. This capability also provides an advantage of protecting critical host login credentials, thereby avoiding a possible security vulnerability.

Figure 5:
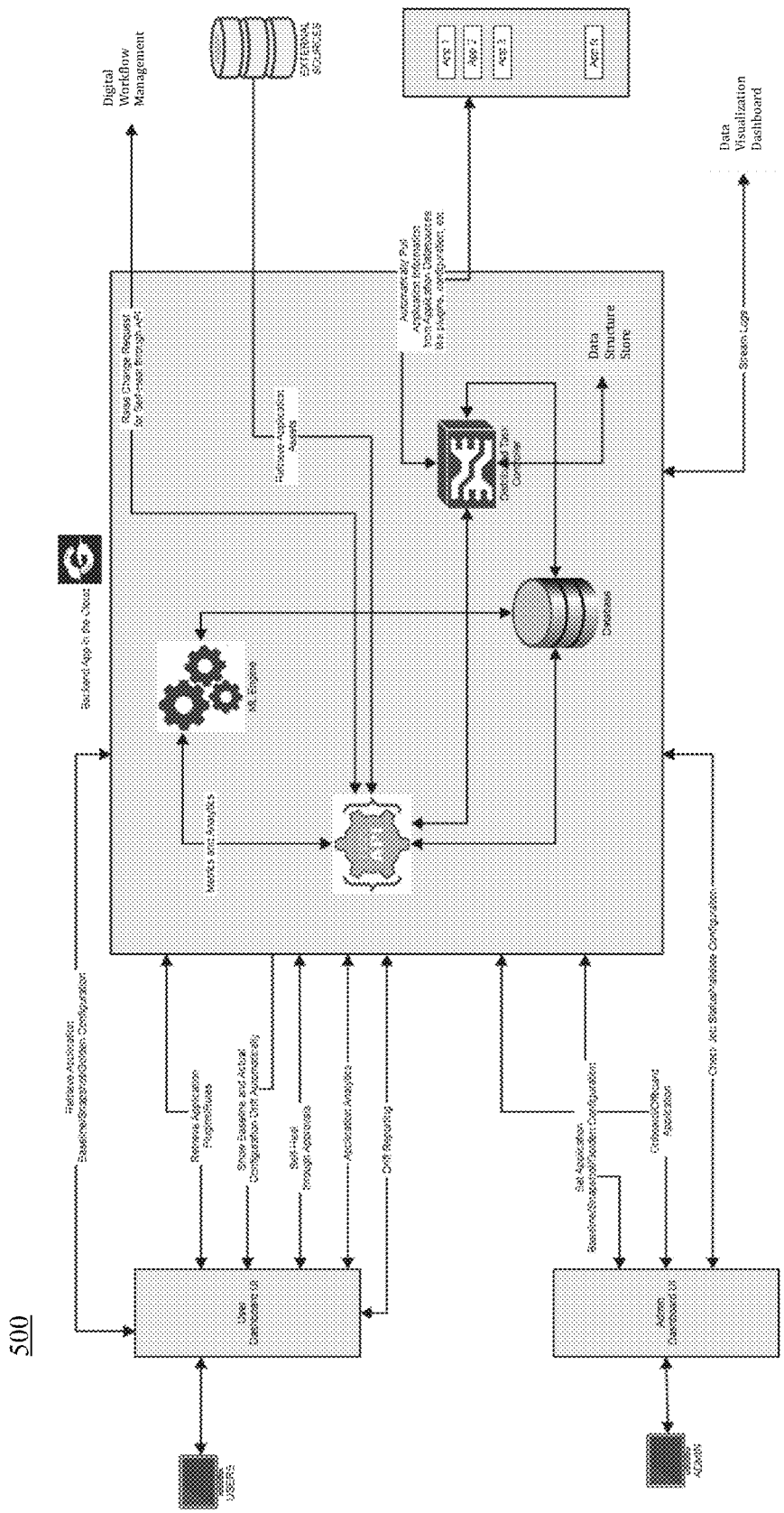
FIG. 5 is a data flow diagram of a process for monitoring and detecting drifts and configuration changes in an infrastructure that facilitates the availability of software applications to a large organization, according to an exemplary embodiment.

Referring to FIG. 5, a data flow diagram 500 of a process for monitoring and detecting drifts and configuration changes in an infrastructure that facilitates the availability of software applications to a large organization is illustrated. The centrally positioned box in FIG. 5 includes a distributed task controller component, which may be embodied as AIAADDM device 202; a database component; an application programming interface (API) component; a machine learning engine component; and a data structure store component. In an exemplary embodiment, the API component may be a web service API that adheres to Representational State Transfer (REST) architectural principles, i.e., a RESTful API.

FIG. 5 also shows several external components that interact with the components included in the centrally positioned box. At the top left portion of FIG. 5, a user device implements a user dashboard user interface (UI) via which various data flows are communicated with the RESTful API. These data flows include: retrieving an application baseline/snapshot/golden configuration; retrieving application plugins and rules; showing a baseline and an actual configuration drift; self-healing through approvals; application analytics; and drift reporting.

At the lower left portion of FIG. 5, an administrator device implements an administrative dashboard UI via which various data flows are communicated with the RESTful API. These data flows include: setting an application baseline/snapshot/golden configuration; onboarding and offboarding an application; checking a job status; and validating a configuration.

On the right side of FIG. 5, a digital workflow management component communicates with the RESTful API to raise a change request for self-heal through the API. External source components may act as sources to enable the RESTful API to retrieve application assets. A suite of applications may be configured to communicate with the distributed task controller to automatically pull application information, such as, for example, plugin information or configuration information, from application data sources. The suite of applications may include, for example, any one or more of an issue tracking and agile project management application, a continuous code quality inspection application, a code repository hosting service application, and a software development automation application; however, any other suitable application may be included. A data visualization dashboard component may be configured to stream logs with the RESTful API.

Accordingly, with this technology, an optimized process for monitoring and detecting drifts and configuration changes in an infrastructure that facilitates the availability of software applications to a large organization is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for managing a configuration of an infrastructure that supports a plurality of applications, the method being implemented by at least one processor, the method comprising:

obtaining, by the at least one processor, metric information that indicates a plurality of values of a plurality of parameters that relates to the infrastructure, the plurality of parameters includes at least a first parameter and a second parameter;

obtaining, by the at least one processor, baseline configuration information of at least one application, the baseline configuration information set via an administrator device and made available via the infrastructure;
obtaining, by the at least one processor, actual configuration information of at least one application that is made available via the infrastructure;
comparing, by the at least one processor, the obtained metric information with a plurality of expected values that relates to the obtained metric information;
determining, by the at least one processor, whether a drift from the baseline configuration information set by the administrator device has occurred based on a result of the comparing, the drift including a configuration drift;
displaying, by the at least one processor and on a display, the configuration drift with the baseline configuration information;
transmitting, to a user by the at least one processor, a notification message that indicates a result of the determining;
determining, when the configuration drift is determined as having occurred, a remedy for the configuration drift; and
applying the determined remedy to the at least one application for curing the configuration drift,
wherein the plurality of parameters includes a first set of parameters that relates to application-specific information, a second set of parameters that relates to database-specific information, and a third set of parameters that relates to servers configured to host the at least one application from among the plurality of applications,
wherein the comparing comprises:
  determining, for the first parameter, a first percentage difference between the obtained metric information for the first parameter and an expected value that relates to the obtained metric information for the first parameter; and
  determining, for the second parameter, a second percentage difference between the obtained metric information for the second parameter and an expected value that relates to the obtained metric information for the second parameter,
wherein the determining of whether the drift has occurred comprises:
  determining whether the first determined percentage difference exceeds a first predetermined threshold value for the first parameter, or determining whether the second determined percentage difference exceeds a second predetermined threshold that is lower than the first predetermined threshold,
  wherein the first predetermined threshold value for the first parameter is at least 10%, and
  wherein the second predetermined threshold value for the second parameter is less than 10%.

2. The method of claim 1, wherein the obtaining of the metric information comprises using at least one microservice to obtain the metric information from the at least one application from among the plurality of applications.

3. The method of claim 1, wherein the comparing comprises using a machine learning algorithm to analyze the obtained metric information and the at least one expected value of the obtained metric information.

4. The method of claim 1, further comprising determining, when a drift is determined as having occurred, a magnitude of the drift.

5. The method of claim 1, wherein the notification message includes:
the obtained metric information for the first parameter and the at least one expected value that relates to the obtained metric information for the first parameter, and
the obtained metric information for the second parameter and the at least one expected value that relates to the obtained metric information for the second parameter.

6. A computing apparatus for managing a configuration of an infrastructure that supports a plurality of applications, the computing apparatus comprising:
a processor;
a memory; and
a communication interface coupled to each of the processor and the memory,
wherein the processor is configured to:
  obtain metric information that indicates a plurality of values of a plurality of parameters that relates to the infrastructure, the plurality of parameters includes at least a first parameter and a second parameter;
  obtain baseline configuration information of at least one application, the baseline configuration information set via an administrator device and made available via the infrastructure;
  obtain configuration information of at least one application that is made available via the infrastructure;
  compare the obtained metric information with a plurality of expected values that relates to the obtained metric information;
  determine whether a drift from the baseline configuration information set by the administrator device has occurred based on a result of the comparison, the drift including a configuration drift;
  display, on a display, the configuration drift with the baseline configuration information;
  transmit, to a user via the communication interface, a notification message that indicates a result of the determination;
  determine, when the configuration drift is determined as having occurred, a remedy for the configuration drift;
  apply the determined remedy to the at least one application for curing the configuration drift,
  wherein the plurality of parameters includes a first set of parameters that relates to application-specific information, a second set of parameters that relates to database-specific information, and a third set of parameters that relates to servers configured to host the at least one application from among the plurality of applications;
  determine, for the first parameter, a first percentage difference between the obtained metric information for the first parameter and an expected value that relates to the obtained metric information for the first parameter;
  determine, for the second parameter, a second percentage difference between the obtained metric information for the second parameter and an expected value that relates to the obtained metric information for the second parameter; and
  determine whether the first determined percentage difference exceeds a first predetermined threshold value for the first parameter, or whether the second determined percentage difference exceeds a second predetermined threshold that is lower than the first predetermined threshold,
  wherein the first predetermined threshold value for the first parameter is at least 10%, and wherein the second predetermined threshold value for the second parameter is less than 10%.

7. The computing apparatus of claim 6, wherein the processor is further configured to obtain the metric information by using at least one microservice to obtain the metric information from the at least one application from among the plurality of applications.

8. The computing apparatus of claim 6, wherein the processor is further configured to perform the comparison by using a machine learning algorithm to analyze the obtained metric information and the at least one expected value of the obtained metric information.

9. The computing apparatus of claim 6, wherein the processor is further configured to determine, when a drift is determined as having occurred, a magnitude of the drift.

10. The computing apparatus of claim 6, wherein the notification message includes:
   the obtained metric information for the first parameter and the at least one expected value that relates to the obtained metric information for the first parameter, and
   the obtained metric information for the second parameter and the at least one expected value that relates to the obtained metric information for the second parameter.

11. A non-transitory computer readable storage medium storing instructions for managing a configuration of an infrastructure that supports a plurality of applications, the storage medium comprising executable code which, when executed by a processor, causes the processor to:
   obtain metric information that indicates a plurality of values of a plurality of parameters that relates to the infrastructure, the plurality of parameters includes at least a first parameter and a second parameter;
   obtain baseline configuration information of at least one application, the baseline configuration information set via an administrator device and made available via the infrastructure;
   obtain configuration information of at least one application that is made available via the infrastructure;
   compare the obtained metric information with a plurality of expected values that relates to the obtained metric information;
   determine whether a drift has occurred based on a result of the comparison, the drift including a configuration drift;
   display, on a display, the configuration drift with the baseline configuration information;
   transmit, to a user, a notification message that indicates a result of the determination;
   determine, when the configuration drift is determined as having occurred, a remedy for the configuration drift;
   apply the determined remedy to the at least one application for curing the configuration drift,
   wherein the plurality of parameters includes a first set of parameters that relates to application-specific information, a second set of parameters that relates to database-specific information, and a third set of parameters that relates to servers configured to host the at least one application from among the plurality of applications;
   determine, for the first parameter, a first percentage difference between the obtained metric information for the first parameter and an expected value that relates to the obtained metric information for the first parameter;
   determine, for the second parameter, a second percentage difference between the obtained metric information for the second parameter and an expected value that relates to the obtained metric information for the second parameter; and
   determine whether the first determined percentage difference exceeds a first predetermined threshold value for the first parameter, or whether the second determined percentage difference exceeds a second predetermined threshold that is lower than the first predetermined threshold,
   wherein the first predetermined threshold value for the first parameter is at least 10%, and
   wherein the second predetermined threshold value for the second parameter is less than 10%.

* * * * *